May 5, 1936. W. B. TALLERDY 2,039,751
AIR BRAKE SYSTEM AND BLEEDER VALVE THEREFOR
Filed April 15, 1935 2 Sheets-Sheet 2
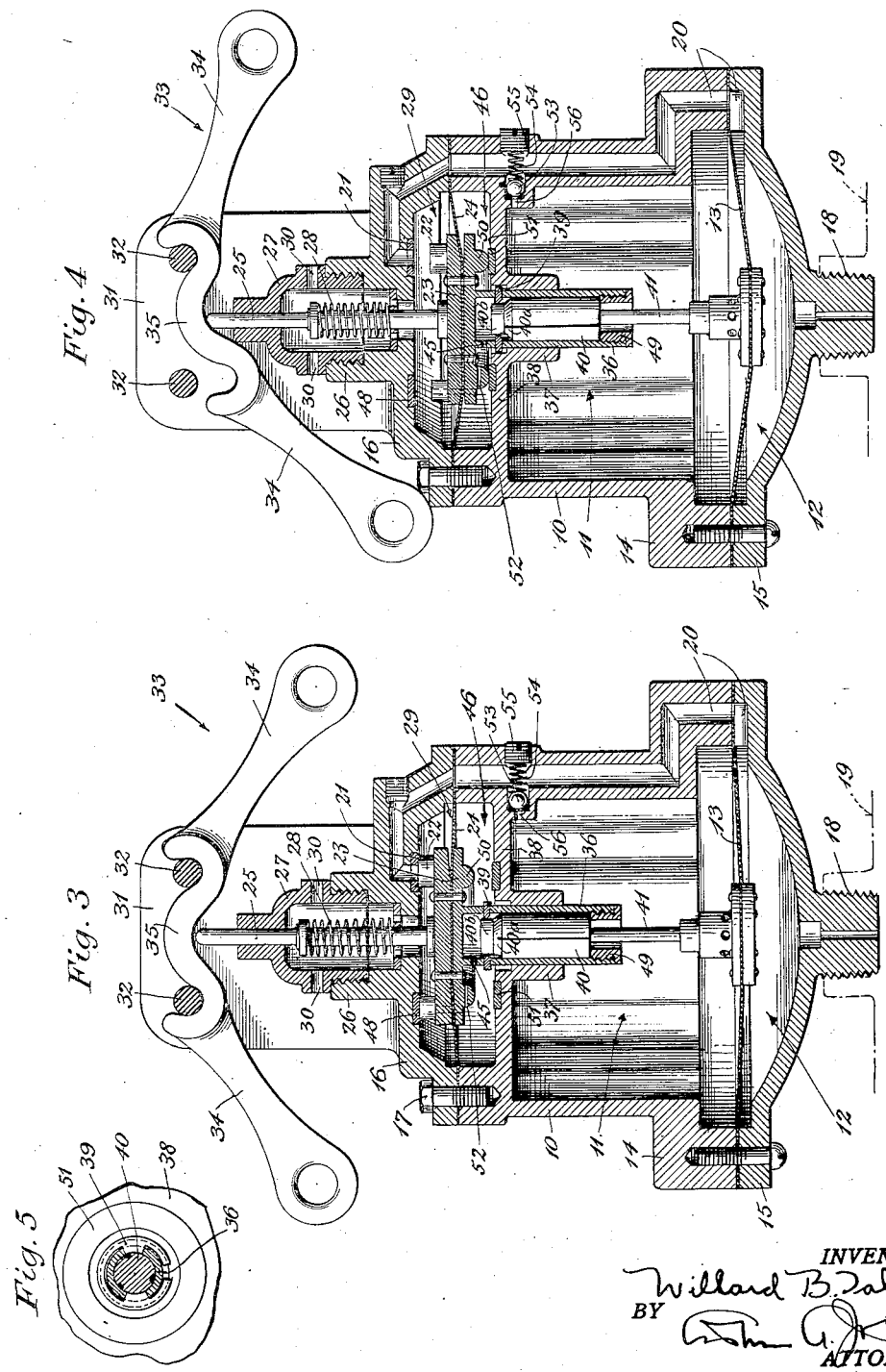

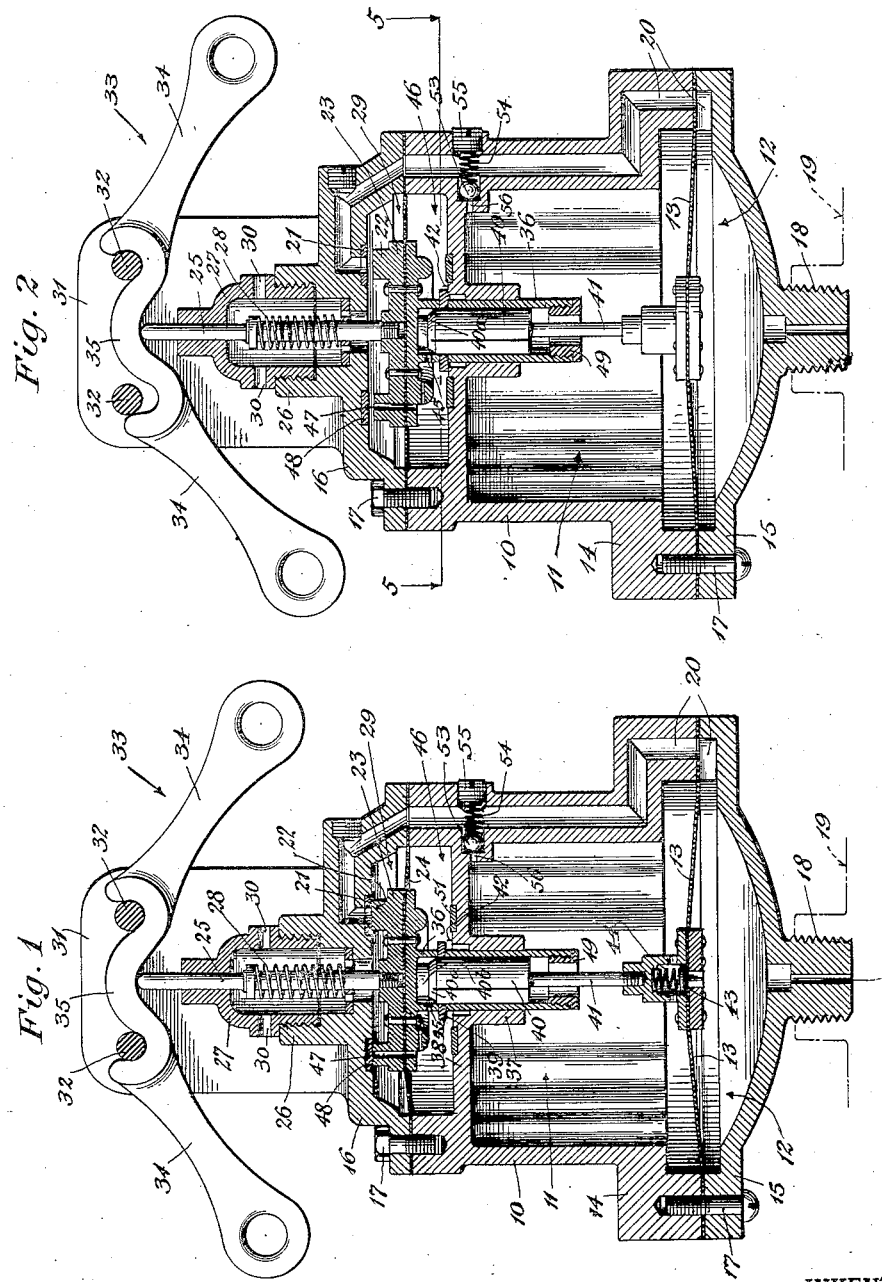

Patented May 5, 1936

2,039,751

UNITED STATES PATENT OFFICE 2,039,751

AIR BRAKE SYSTEM AND BLEEDER VALVE THEREFOR

Willard B. Tallerdy, Bridgeport, Conn.

Application April 15, 1935, Serial No. 16,439

19 Claims. (Cl. 303—80)

This invention relates to air brake systems for railroad trains, and more particularly, to improvements in bleeder and test valves usually applied to the reservoirs or auxiliaries of such systems.

These valves are provided for the purpose of permitting inspectors to ascertain whether or not the air supply means in the braking system is functioning, and also to permit yardmen to release the air brakes on cars located in yards, for instance, prior to switching them.

Such devices as heretofore made included a valve within a suitable housing or body and having actuating mechanism in the form of a rocker arm connected by rods to opposite sides of the car under the body, so that the valve can be opened for an instant to ascertain, by the escape of air, whether the braking mechanism is functioning when it is desired to release the brakes, but these valves as heretofore constructed, had to be held open by hand in performing the brake-releasing operation, and it required considerable time to bleed the reservoir or auxiliary.

An object of the present invention is to provide a construction in which, upon being operated while the brakes are released, the valve will permit the escape of air and will immediately close upon the removal of the operating force from the lever, but in which, when the brakes are applied and the air pressure in the auxiliary or reservoir is relatively low, the valve will remain open automatically for a predetermined length of time, permitting the air in the auxiliary or reservoir to escape and release the brakes and closing automatically and return to normal position after the lapse of sufficient time for the auxiliary or reservoir to be bleeded and the brake released.

Thus, with the device of the present invention, if the brakes are to be released, it is merely necessary for the yardman to open valve after valve on the cars of a train and do nothing further with them, for the valves will automatically close again when the brakes have had an opportunity to become released and the air in the auxiliary is exhausted.

With the device of the present invention, therefore, much time may be saved in releasing the brakes of cars in the siding or yard, and the time required for the mechanic to remain in the hazardous position between the tracks is reduced to a minimum.

In the form of the invention herein disclosed, the objects of this invention are accomplished by providing means responsive to the pressure of the air in the auxiliary or reservoir for controlling the opening movements of the escape valve so that a partial stroke movement is made when the valve is operated while the brakes are released and a full stroke movement of the valve is produced when the valve is operated while the brakes are applied. When the valve is only partially opened or cracked, as when it is desired to test the braking system, the valve immediately returns to closed position upon removal of the actuating force on the operating lever. Or, when the valve is given a full-stroke due to the brakes being applied, air under pressure in the chamber provided in the body of the valve maintains the valve in fully opened position for a predetermined length of time during which the brakes become released. After this time, the return spring moves the escape valve to closed position and maintains it in that position until the release lever is again operated.

Other features and advantages will hereinafter appear.

In the accompanying drawings—

Figure 1 is a vertical section taken through the device of the present invention, and showing it in its normal position with the brakes released.

Fig. 2 is a similar view, but showing the positions of the parts when the valve is operated at a time that the brakes are released, that is to say, when the valve is operated to test the functioning of the system.

Fig. 3 is a view similar to Fig. 1, but showing the parts in the positions they assume when the brakes have been applied.

Fig. 4 is a view similar to Fig. 2, but showing the positions of the parts when the brakes are applied and the valve is operated.

Fig. 5 is a fractional plan view of the central portion of the device, substantially on line 5—5 of Fig. 2.

As shown in the accompanying drawings, the device of the present invention has a body portion 10 which may have any suitable or desirable construction. It has an upper chamber 11 and a lower chamber 12 separated by a diaphragm 13. As shown, the body 10 is made of several parts having a main portion 14, a bottom closure 15, and a top closure 16, the parts 15 and 16 being secured to the main portion 14 by screws 17.

The bottom 15 is provided with a threaded neck 18 to be screwed into the main wall or other part of a reservoir or auxiliary 19 so that the chamber 12 is in communication with the interior of the reservoir 19, and the diaphragm 13 is operated by the air within the chamber 12 and coming from the reservoir 19.

From the chamber 12 there is an air-escape passage 20 through the body 10 terminating in an outlet having a valve seat 21 in the upper portion 16 of the body. This outlet is normally closed by a valve 22 on a valve disk 23 which is mounted on a diaphragm 24 (for purposes hereinafter to appear), and clamped between the portions 14 and 16 of the body in the specific embodiment of the invention herein disclosed.

The valve disk 23 is mounted on a stem 25 extending through a boss 26 on the cap 16 and guided for movement by a bonnet 27. A spring 28 normally tends to hold the valve disk at the upper limit of its movement with the valve 22 resting against the seat 21.

When air escapes from the passage 20 past the valve seat 21, it is free to pass to the atmosphere through a chamber 29 above the diaphragm 24 and through spaces between the stem 25 and the boss and bonnet from which it may escape through outlets 30.

The cap 16 is provided with vertical extensions 31 having pins 32 on which is fulcrumed an operating lever 33. The operating lever has two arms 34, either of which may be swung upwardly to release the valve, the arms 34 being joined together by a yoke 35 which engages the top of the stem 25. When either arm 34 is rocked upwardly, the lever fulcrum on the adjacent pin 32 and the yoke 35 depresses the stem 25 to open the valve.

As above pointed out, the extent of the opening movement which may be given to the valve 22 by the operation of the lever 33 depends upon the pressure of the air in the auxiliary or reservoir 19, and the latter as is well known depends upon whether the brakes are applied or released.

For the purpose of controlling the extent of movements of the valve 22 as well as determining the time at which it will again close, the valve disk 23 is provided with a sleeve 36 slidably mounted in a collar 37 on a transverse wall 38 of the body portion 14, and means are provided for controlling the valve 22 through the medium of this sleeve 36.

This is done by providing a stop on the sleeve 36 whereby its movement in opening direction is limited and controlling this stop by the position of the diaphragm 13.

In the form of the invention herein disclosed, for this purpose the sleeve 36 has a resilient ring 39 which is arranged substantially as shown in Fig. 3, having portions within the sleeve as well as portions outside of it, and this ring 39 is expanded into stopping position or allowed to contract to non-stopping position by means of a plunger 40 sliding within the sleeve 36 and mounted on a stem 41 connected to the diaphragm 13. When the plunger 40 is in its uppermost position shown in Fig. 1, the ring 39 is expanded so that its outer portion engages a shoulder 42 on the wall 38 and limits the opening movement of the valve 22. When, however, the plunger 40 is pulled down to the position shown in Fig. 3, the ring 39 being resilient contracts so that when the valve disk 23 and sleeve 36 are depressed, the ring 39 will not engage the shoulder 42 but will allow the full stroke opening movement of the valve. The plunger 40 has a conical portion 40a to spread the ring 39 when the plunger moves upwardly in the sleeve 36 and a reduced cylindrical portion 40b to centralize the ring when the plunger is moved down.

A one-way valve 43 is provided between the chambers 11 and 12. As shown, it is mounted on the diaphragm 13. This one-way valve is provided so that air may pass from the chamber 12 into the chamber 11, and a spring 44 for the one-way valve is of such tension that the pressure in the chamber 11 is normally somewhat less, say five pounds, than the pressure in the chamber 12, thereby causing the diaphragm to be bowed upwardly as shown in Fig. 1.

The air in the chamber 11 escapes through grooves in the plunger 40 or between the adjacent surfaces of the latter and the sleeve 36, and it passes out of the sleeve through ports 45 into a chamber 46 between the diaphragm 24 and the transverse wall 38, so that the pressure of the air in the chamber 46 is normally the same as the pressure of the air in the chamber 11.

When the brakes on a car stand released, the pressure of the air in the chamber 12 is greater than the pressure of the air in the chamber 11, and the parts occupy the position shown in Fig. 1. If the operating lever 33 is rocked at this time, the yoke 35 will push down the valve disk 23 to the position shown in Fig. 2, in which the air valve 22 is moved slightly from the seat 21 allowing some air to escape so that it may be determined whether or not the braking system is functioning.

When the valve disk 23 is depressed, air is also allowed to escape from the chamber 46 so that the air in the chamber 46 will not prevent the depression of the valve disk. The air in the chamber 46 is vented at this time through a passage 47 in the valve disk and diaphragm which is normally closed by a seat 48 on the top portion 16 of the valve, and this passage 47 is opened when the valve disk is depressed and is closed immediately upon its return to normal position shown in Fig. 1. When the air is permitted to escape from the chamber 12, through the passage 20, under the conditions shown in Figs. 1 and 2, it continues to flow into the chamber 12 from the reservoir or auxiliary maintaining the pressure of the air in the chamber 12 greater than the pressure of the air in the chamber 11.

Upon the release of the operating lever 33, there being nothing to hold the valve disk 23 down, it is returned to its normal position by the spring 28 and the valves 21—22 and 47—48 are closed (see Figs. 1 and 3).

When the pressure in the reservoir or auxiliary decreases substantially as when the brakes are applied to a car, the diaphragm 13 bows downwardly and the parts take the position shown in Fig. 3, because at this time the pressure of the air in the chamber 11 is greater than that in the chamber 12. When the diaphragm 13 descends, the plunger 40 permits the ring 39 to contract, but otherwise the parts maintain their usual normal position.

In order to move the car, it is necessary to permit the escape of air from the reservoir or auxiliary, and heretofore it was necessary for a man to go from car to car of a train holding each bleed valve open until the air in the reservoir or auxiliary thereof escaped and the brakes were released. The handles for operating the bleed valves are located at the sides of the cars, and it was necessary for the man to stand alongside of a car while holding the valve open.

Thus, it not only required a long time to bleed the auxiliaries or reservoirs of the cars of a train in a siding or yard, but required the workmen to be in the relatively hazardous position alongside of the cars while performing these operations.

According to the present invention, the workman needs merely to proceed from car to car operating the levers 33 to depress the valve disk 23 and leave the lever in operated position. With the device of the present invention, the valve 23 will remain open until the air in the reservoir or auxiliary has had an opportunity to escape so as to release the brakes, after which time the valve disk 23 automatically returns to normal closed position. When the cars are again coupled to an air line, the reservoirs or auxiliaries may again be filled with air as in the ordinary operation of the braking system.

When the parts are in the position shown in Fig. 3, and the lever 33 is operated, the valve disk 23 is depressed to its full extent, the ring 39 passing below the shoulder 42 on the transverse wall 38. This permits the air in the chamber 12, already lower in pressure than the air in the chamber 11, to escape through the escape port 20 past the valve 22 to the atmosphere, thus further reducing the pressure in the chamber 12 and causing the diaphragm 13 to descend still farther, going down until the lower end of the plunger 40 engages a hollow plug 49 inserted in the sleeve 36. When this occurs, the air under pressure in the chamber 11 holds the valve disk 23 depressed even against the tension of the spring 28 which tends to return it to closed position and even though the actuating force be removed from the lever 33.

In this situation where the parts are located as shown in Fig. 4, the air in the chamber 11 would escape therefrom through the passages above described, including the vent 47 at a rate depending upon the cross-sectional area of the smallest passage, and the valve 22 will be held open until the pressure in the chamber 11 is reduced to a point approaching the pressure in the chamber 12 at the time that the brakes are released.

For the purpose of accurately regulating the escape of air from the chamber 11, the valve disk 23 is provided with a circular ring 50 which engages a seat 51 on the transverse wall 38 and acts as a barrier to the escape of air from the vicinity of the sleeve 36, hub 37, plunger 40, to the outer portion of the valve disk 23, where the vent 47 is located, and the ring 50 is provided with a transverse metering groove or passage 52 permitting the air to escape from the chamber 11 at a predetermined rate and requiring substantially a predetermined time.

When the air in the chamber 11 is reduced to a pressure substantially equaling the pressure of the return spring 28 on the valve disk 23, the latter, the plunger 40, and the diaphragm 13, will be pulled up by the spring 28 causing the valve 20—21 to be closed and the parts to assume the position shown in Fig. 1.

Since the pressure in the chamber 11 is dependent upon (but not equal to) the pressure in the reservoir or auxiliary and the chamber 12, and since the pressure in the chamber 12 may vary when the brakes stand released, the pressure in the chamber 11 is also susceptible to some variation, and this, it will be observed, will cause the period of time during which the valve 20—21 remains open to be variable.

To more accurately determine the length of time during which the valve 20—21 remains open, the pressure-regulating valve, comprising a ball 53 and a spring 54 adjustable by means of a screw 55 and having an opening 56 into the chamber 11, is provided. With this pressure-regulating valve employed, when the brakes are applied and the pressure in the chamber 12 and escape passage 20 is reduced, air may escape from the chamber 11 into the escape passage 20 and chamber 12 until there is a predetermined and known pressure in the chamber 11. Hence, when the lever 33 is operated while the brakes are applied, the device will permit the valve 20—21 to remain open for a quite accurately predetermined length of time.

It should be understood, however, that the use of the pressure-regulating valve 53—54 is preferable but not essential.

Besides serving the function above referred to, the pressure-regulating valve 53 also serves the function of preventing the valve 20—21 from being opened unintentionally when, due to some unusual condition, the pressure in the chamber 12 gets so low that the air in the chamber 11 would tend to operate the valve 20—21. When this condition exists, the air in the chamber 11 will vent out through the relief valve 53 into the escape passage 20 and chamber 12.

In order that the force applied in an upward direction on the diaphragm 24 shall never be as great as the force applied downwardly on the diaphragm 13, the latter is made substantially larger than the former. Hence, when the valve is opened by the actuation of the lever 33, it will remain opened until the pressure in the chamber 12 is greater than the pressure in the chamber 11, even though the pressure in the chamber 46 is substantially the same as the pressure in the chamber 11 with which it communicates.

It will be noted that air passes from the reservoir 19 to the chamber 12 through a restricted opening in the neck 18. This neck is restricted so that during manual opening of the valve when the brakes are on as shown in Fig. 3, there will be such a quick reduction of air pressure in the chamber 12 through the escape port 20 that the diaphragm 13, despite the connection of the chamber 12 with the reservoir or auxiliary 19, will remain depressed as in Fig. 3, and will become further and further depressed as above described until it reaches the condition shown in Fig. 4. Therefore, the valve arm 34 can be released immediately it is depressed instead of having to be held in depressed position for perhaps several seconds.

It should be understood, of course, that the valves in the device of the present invention are airtight when seated, and that they have rubber or similar airtight seats.

Variations and modifications may be made within the scope of this invention and portions of the improvements may be used without others.

I claim:

1. The combination of an air reservoir of a braking system and a bleeder valve connected to said air reservoir and having an air-escape valve, means to operate said valve including a valve-release lever to open the valve and permit air in said reservoir to escape, means responsive to air pressure in the reservoir to cause the valve to immediately close upon the release of actuating force on said lever while the reservoir is charged or is being charged and the brakes stand released, and means responsive to a different air pressure in the reservoir to cause said valve to be delayed in its closing movements, when the pressure in the reservoir is reduced due to the brakes being applied.

2. The combination of a reservoir of an air brake system and bleeder valve connected to said reservoir and having an air-escape valve, means for moving said valve to open the same to permit the escape of the air from the reservoir, and means including a positive stop the position of which is controlled by the pressure in the reservoir for causing said valve to have full-stroke or partial-stroke opening movements depending upon the amount of air pressure in said reservoir at the time of operation of the valve.

3. The combination of a reservoir of an air brake system and bleeder valve connected to said reservoir and having an air-escape valve, means for moving said valve to open the same to permit the escape of the air from the reservoir, and means for controlling the degree of valve opening and including a stop variable to become operative or inoperative according as the pressure in the reservoir is high or low, said stop when operative limiting said valve to a partial-stroke opening movement to permit escape of air for testing purposes when the brakes of the system are released and the pressure of the air in the reservoir is relatively high.

4. The combination of a reservoir of an air brake system and bleeder valve connected to said reservoir and having an air-escape valve, means for moving said valve to open the same to permit the escape of the air from the reservoir, means including a movable stop for causing said valve to have full-stroke opening movement to permit air to escape from said reservoir and release the brakes of the system, and means for moving said stop to inoperative position when, at the time said valve is opened, the pressure in said reservoir is relatively low due to the brakes having been applied.

5. The combination of a reservoir of an air brake system and bleeder valve connected to said reservoir and having an air-escape valve, means for moving said valve to open the same to permit the escape of the air from the reservoir, means for predetermining the extent of the stroke of said valve on opening the same, the means last-mentioned controlled by the degree of air pressure in the reservoir when said valve is opened and for causing said valve to have full-stroke opening movement to permit air to escape from said reservoir and release the brakes of the system only when, at the time said valve is opened, the pressure in said reservoir is relatively low due to the brakes having been applied, and means for maintaining the valve open after being given a full-stroke movement until after the air in the reservoir is exhausted.

6. The combination of a reservoir of an air brake system and bleeder valve connected to said reservoir and having an air-escape valve, means for moving said valve to open the same to permit the escape of the air from the reservoir, means for predetermining the extent of the stroke of said valve on opening the same, the means last-mentioned controlled by the degree of air pressure in the reservoir when said valve is opened and for causing said valve to have full-stroke opening movement to permit air to escape from said reservoir and release the brakes of the system only when, at the time said valve is opened, the pressure in said reservoir is relatively low due to the brakes having been applied, and means for delaying the closing of the valve after the valve has been given a full-stroke opening movement until after the air in the reservoir is exhausted.

7. The combination of a reservoir of an air brake system and bleeder valve connected to said reservoir and having an air-escape valve, means for manually moving said valve to open the same to permit the slow escape of the air from the reservoir, means functioning in response to relatively low pressure in the reservoir for causing said valve to have full-stroke opening movement to provide a large opening to permit air to escape rapidly from said reservoir and release the brakes of the system when, at the time said valve is opened, the pressure in said reservoir is relatively low due to the brakes having been applied, and means for automatically closing the valve after the lapse of a predetermined time during which the air in the reservoir is permitted to escape.

8. The combination of a reservoir of an air brake system and bleeder valve connected to said reservoir and having an air-escape valve, means for moving said valve to open the same to permit the escape of the air from the reservoir, means including a movable stop the position of which is controlled by the air pressure in the reservoir for causing said valve to have only a partial-stroke opening movement to permit escape of air for testing purposes when the brakes of the system are released and the pressure of the air in the reservoir is relatively high, and means for closing the valve immediately upon release of the same after receiving said partial-stroke opening movement.

9. The combination of an air reservoir of a braking system and a bleeder valve connected to said air reservoir and having a hollow body, an air-escape valve, means to operate said valve including a valve-release lever to open the valve and permit air in said reservoir to completely escape, a diaphragm dividing the hollow body into two chambers and movable independently of the valve, and means including means responsive to the difference in air pressure between said two chambers and the position of said diaphragm prior to the operation of the valve to cause the valve to immediately close upon the release of actuating force on said lever, or to be delayed in its closing movements by the presence of air under pressure trapped in one of said chambers.

10. The combination of a reservoir of an air brake system and bleeder valve having a hollow body, an air-escape port, a valve therefor, a diaphragm dividing the hollow body into two chambers, means for moving said valve to open the port to permit the escape of the air from the reservoir, and means controlled by said diaphragm for causing said valve to have full-stroke or partial-stroke opening movement depending upon the difference in air pressure between said chambers at the time of operation of the valve.

11. The combination of a reservoir of an air brake system and bleeder valve having a hollow body, an air-escape port, a valve therefor, a diaphragm dividing the hollow body into two chambers, means for moving said valve to open the port to permit the escape of the air from the reservoir, and means controlled by the diaphragm and including a stop variable to become operative or inoperative according as the pressure in the reservoir is high or low and an actuator operated by the diaphragm for automatically rendering such stop operative for limiting the movement of the said valve in opening direction to a partial-stroke to permit escape of air for testing purposes when the brakes of the system stand released.

12. The combination of a reservoir of an air brake system and bleeder valve having a hollow body, an air-escape port, a valve therefor, a diaphragm dividing the hollow body into two chambers, means for moving said valve to open the port to permit the escape of the air from the reservoir, and means including a retractable stop controlled by said diaphragm for causing said valve to have a full stroke in opening direction to permit air to escape from said reservoir and release the brakes of the system if, at the time said valve is opened, the diaphragm is depressed due to the brakes having been applied.

13. The combination of a reservoir of an air brake system and bleeder valve having a hollow body, an air-escape port, a valve therefor, a diaphragm dividing the hollow body into two chambers, means for moving said valve to open the port to permit the escape of the air from the reservoir, means including a retractable stop controlled by said diaphragm for causing said valve to have a full stroke in opening direction to permit air to escape from said reservoir and release the brakes of the system if, at the time said valve is opened, the diaphragm is depressed due to the brakes having been applied, and means including another diaphragm and a restricted escape opening for maintaining the valve open for a predetermined length of time after being given a full stroke movement.

14. The combination of a reservoir of an air brake system and bleeder valve having a hollow body, an air-escape port, a valve therefor, a diaphragm dividing the hollow body into two chambers, means for moving said valve to open the port to permit the escape of the air from the reservoir, means including a retractable stop controlled by said diaphragm for causing said valve to have a full stroke in opening direction to permit air to escape from said reservoir and release the brakes of the system if, at the time said valve is opened, the diaphragm is depressed due to the brakes having been applied, and means including a restricted air-escape passage for delaying the closing of the valve after the valve has been given a full stroke opening movement.

15. A combined test and bleeder valve for airbrake systems comprising a hollow body, an air-escape passage through said body provided with an outlet seat, a valve normally urged against said seat to prevent escape of air, manually operated means for moving the valve off said seat to permit escape of air, and means including a positive stop movable to different positions by different pressures of the air in said chamber for regulating the extent of movement given to the valve in opening direction.

16. A combined test and bleeder valve for airbrake systems comprising a hollow body, an air-escape passage through said body provided with an outlet seat, a valve normally urged against said seat to prevent escape of air, manually operated means for moving the valve off said seat to permit escape of air, a diaphragm dividing said hollow body into two chambers, a primary chamber in direct communication with said air-escape passage and a secondary chamber, a one-way valve permitting air to pass into the secondary chamber from the primary chamber, and a stop controlled by said diaphragm when the air pressure in the primary chamber is substantially greater than the air pressure in the secondary chamber to limit the opening movements of said escape valve.

17. A combined test and bleeder valve for airbrake systems comprising a hollow body, an air-escape passage through said body provided with an outlet seat, a valve normally urged against said seat to prevent escape of air, manually operated means for moving the valve off said seat to permit escape of air, a diaphragm dividing said hollow body into two chambers, a primary chamber in direct communication with said air-escape passage and a secondary chamber, a one-way valve permitting air to pass into the secondary chamber from the primary chamber, a wall separating the secondary chamber from a third chamber, a diaphragm stretched across the third chamber and carrying said escape-valve, a sleeve carried by the escape valve, a stop carried by the sleeve, cooperating stops on said dividing wall, and a member operated by said first-named diaphragm for moving said stop on the valve sleeve into position to engage the stop on the dividing wall to limit the movement of the escape valve.

18. A combined test and bleeder valve for airbrake systems comprising a hollow body, an air-escape passage through said body provided with an outlet seat, a valve normally urged against said seat to prevent escape of air, manually operated means for moving the valve off said seat to permit escape of air, a diphragm dividing said hollow body into two chambers, a primary chamber in direct communication with said air-escape passage and a secondary chamber, a one-way valve permitting air to pass into the secondary chamber from the primary chamber, a wall separating the secondary chamber from a third chamber, a diaphragm stretched across the third chamber and carrying said escape valve, a sleeve carried by the escape valve, a stop carried by the sleeve, cooperating stops on said dividing wall, a member operated by said first-named diaphragm for moving said stop on the valve sleeve into position to engage the stop on the dividing wall to limit the movement of the escape valve, air-escape passages between the secondary chamber and the chamber between the dividing wall and the valve diaphragm, cooperating valve seats on the valve diaphragm and on the dividing wall and movable into engagement when the valve is moved to full open position, and a metered escape passage to permit escape of air at a predetermined rate of flow past said cooperating valve seats and through the diaphragm to the atmosphere to cause said member on the diaphragm between the primary and secondary chambers to hold the valve open for a predetermined length of time to permit escape of air from said braking system to release the brakes.

19. The invention as defined in claim 18, in which there is provided a relief valve between the secondary chamber and the primary chamber for the escape passage whereby the difference in pressure between the secondary chamber and the primary chamber is maintained at a predetermined maximum.

WILLARD B. TALLERDY.